United States Patent
Ohkawa

(10) Patent No.: US 7,729,009 B2
(45) Date of Patent: Jun. 1, 2010

(54) IMAGE PROCESSING APPARATUS, IMAGE FORMING APPARATUS, IMAGE PROCESSING METHOD AND RECORDING MEDIUM

(75) Inventor: Mieko Ohkawa, Hachioji (JP)

(73) Assignee: Monica Minolta Business Technologies, Inc., Tokyo (JP)

( * ) Notice: Subject to any disclaimer, the term of this patent is extended or adjusted under 35 U.S.C. 154(b) by 889 days.

(21) Appl. No.: 11/476,180

(22) Filed: Jun. 27, 2006

(65) Prior Publication Data

US 2007/0035789 A1   Feb. 15, 2007

(30) Foreign Application Priority Data

Aug. 12, 2005   (JP)   .............. 2005-234346

(51) Int. Cl.
*H04N 1/60*   (2006.01)
*G03F 3/08*   (2006.01)

(52) U.S. Cl. .............. 358/1.9; 358/3.24; 358/520; 358/522

(58) Field of Classification Search .............. 382/552, 382/171, 163, 167, 162, 271, 272, 273, 274, 382/275, 270, 309, 168; 358/1.1, 1.9, 522, 358/520, 518, 527, 1.18, 1.15, 452, 537, 358/3.24, 523, 524, 465, 466; 348/672, 234, 348/235, 238, 396.1, 489, 493, 609, 631, 348/663, 712; 399/4, 39, 344; 347/24, 115, 347/172, 232; 702/180
See application file for complete search history.

(56) References Cited

U.S. PATENT DOCUMENTS

2003/0038984 A1 *  2/2003  Ohkawa .............. 358/462
2004/0197021 A1 * 10/2004  Huang et al. .............. 382/162

FOREIGN PATENT DOCUMENTS

JP   2002-084409 A   3/2002

* cited by examiner

*Primary Examiner*—Dov Popovici
(74) *Attorney, Agent, or Firm*—Frishauf, Holtz, Goodman & Chick, P.C.

(57) ABSTRACT

An is an image processing apparatus including: an image memory section to store an image data obtained by reading an image of an original manuscript; an external light memory section to store a data of external light entering to a stage for the original manuscript and to form histograms of each color based on the data of external light; a judging section to calculate an external light level from a higher luminance by each color out of luminance values of a foot of a peak including a maximum frequency value measured on the histograms; and an area detecting section to determine a non-image area erase threshold based on the external light level, so as to detect an image area and to erase a non-image area.

16 Claims, 11 Drawing Sheets

NON-IMAGE AREA ERASE CHECK
INSTALLATION CONDITION OF MACHINE IS CHECKED.

OPEN THE PLATEN (RADF).
PUSH START BUTTON,
AND THE CHECK STARTS.

START

PREVIOUS

FIG.5

| WARNING LEVEL | DISPLAYED SENTENCES |
|---|---|
| 0 | MACHINE WORKS SUCCESSFULLY. NON-IMAGE AREA ERASE IS APPROPRIATELY SET. |
| 1 | MACHINE WORKS SUCCESSFULLY, BUT "REGARDING RED DATA", DATA HAS BEEN FOUND IN WHICH NON-IMAGE AREA ERASE DOES NOT WORK PROPERLY. THE ERASING MAY FAIL ON AN ORIGINAL MANUSCRIPT HAVING A RED COLOR. |
| 2 | "REGARDING RED DATA", DATA HAS BEEN FOUND IN WHICH NON-IMAGE AREA ERASE DOES NOT WORK PROPERLY. |

FIG.11

| WARNING LEVEL | DISPLAYED SENTENCES |
|---|---|
| 0 | MACHINE WORKS SUCCESSFULLY. NON-IMAGE AREA ERASE IS APPROPRIATELY SET. |
| 1 | MACHINE WORKS SUCCESSFULLY, BUT DATA HAS BEEN FOUND IN WHICH NON-IMAGE AREA ERASE DOES NOT WORK PROPERLY. THE ERASING MAY FAIL ON A DARK ORIGINAL MANUSCRIPT. |
| 2 | DATA HAS BEEN FOUND IN WHICH NON-IMAGE AREA ERASE DOES NOT WORK PROPERLY. |

US 7,729,009 B2

IMAGE PROCESSING APPARATUS, IMAGE FORMING APPARATUS, IMAGE PROCESSING METHOD AND RECORDING MEDIUM

BACKGROUND OF THE INVENTION

1. Field of the Invention

The present invention relates to an image processing apparatus, an image forming apparatus, an image processing method and a recording medium, which have a function to erase a non-image area.

2. Description of Related Art

An image processing apparatus provided in a conventional image forming apparatus has a so-called non-image area erase function, which is to prevent toner transcription and the like in the non-image area by distinguishing an image area and a non-image area and by replacing a black pixel with a white pixel. The image forming apparatus described in JP-2002-84409A reads monochrome density and a luminance data of external light by performing sky shot, and confirms a luminance value of a foot of a peak including a maximum frequency value measured on the histogram thereof, when an image area is detected. Subsequently, as shown in FIG. 10, the higher luminance out of the confirmed luminance values is set as an external light level. Based on the external light level, environment where an image forming apparatus is installed is checked and the check result is displayed on display means. FIG. 11 shows a display example of a check result of environment where an image forming apparatus is installed, and sentences are displayed according to the Warning Level.

However, an image processing apparatus provided in a conventional image forming apparatus erases a non-image area by using the histogram based on monochrome density of external light. Thus, the image processing apparatus has never checked the environment in consideration of colors of external light. Therefore, it has been problematic that even an image forming apparatus compatible with colorization is not capable of accurately erasing a non-image area in a colored original manuscript according to a color of external light.

The present invention has been developed in consideration of this problem, and an object of the present invention is to provide an image processing apparatus, an image forming apparatus, an image processing method and a recording medium, which can erase a non-image area according to a color of external light.

SUMMARY OF THE INVENTION

To accomplish the above object, according to a first aspect of the present invention, an image processing apparatus comprises: an image memory section to store an image data obtained by reading an image of an original manuscript; an external light memory section to store a data of external light entering to a stage for the original manuscript and to form histograms of each color based on the data of external light; a judging section to calculate an external light level from a higher luminance by each color out of luminance values of a foot of a peak including a maximum frequency value measured on the histograms; and an area detecting section to determine a non-image area erase threshold based on the external light level, so as to detect an image area and to erase a non-image area.

Thus, an external light memory section stores an external light data and draws histograms by each color based on the external light data. A judging section calculates an external light level on the histograms of external light. An area detecting section determines a non-image area erase threshold by each color based on the histograms, detects an image area in consideration of a color of external light, and erases a non-image area.

Herein, the non-image area erase threshold is a threshold to distinguish an image area from the non-image area, and an area showing a luminance value which is a non-image area erase threshold or more is detected as an image area.

According to a second aspect of the present invention, an image forming apparatus comprises: an image reading section to read an external light data and an image data; an image processing apparatus comprising an image memory section to store an image data obtained by reading an image of an original manuscript, an external light memory section to store a data of external light entering to a stage for the original manuscript and to form histograms of each color based on the external light data, a judging section to calculate an external light level from a higher luminance by each color out of luminance values of a foot of a peak including a maximum frequency value measured on the histograms, and an area detecting section to determine a non-image area erase threshold based on the external light level so as to detect an image area and to erase a non-image area; an operating section to display a judgment result by the judging section; an image forming section to form an image on a recording material based on a signal from the image processing apparatus; and a controlling section to allow the image reading section to read the image data, to allow the operating section to display a judgment result of whether or not an environment is suitable for erasing a non-image area, to allow the image processing apparatus to process the image data, and to allow the image forming section to form the image based on the processed image data.

Thus, the image reading section reads an external light entering to a stage for original manuscript. The external light memory section draws histograms of each color. The judging section calculates an external light level. The operating section displays the judgment result. In addition, the area detecting section erases a non-image area, and the image forming apparatus forms an image on a recording material.

According to a third aspect of the present invention, an image processing method comprises the steps of: storing an image data obtained by reading an image of an original manuscript; forming histograms of each color based on an external light data which is obtained by storing a data of external light entering to a stage for the original manuscript; calculating the external light level from a higher luminance by each color out of luminance values of a foot of a peak including a maximum frequency value measured on the histograms; and determining a non-image area erase threshold based on the external light level so as to detect an image area and to erase a non-image area.

Thus, the external memory section stores an external light data, and draws histograms by each color based on the external light data. The judging section calculates an external light level on the histograms of external light. The area detecting section determines the non-image area erase threshold by each color based on the histograms, detects an image area in consideration of a color of external light.

According to a fourth aspect of the present invention, a recording medium storing a program which causes a computer to carry out the functions of: storing an image data obtained by reading an image of an original manuscript in an image memory section; forming histograms of each color based on an external light data which is obtained by storing a data of external light entering to a stage for the original manuscript in an external light memory section; calculating an external light level from a higher luminance by each color out of luminance values of a foot of a peak including a maximum frequency value measured on the histograms; and allowing an area detecting section to determine a non-image area erase threshold based on the external light level so as to detect an image area and to erase a non-image area.

Thus, the external light memory section stores an external light data and draws histograms by each color based on the external light data. The judging section calculates an external light level on the histograms of external light. The area detecting section determines the non-image area erase threshold by each color based on the histograms, detects the image area in consideration of a color of external light, and erases the non-image area.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 3 is a front view showing a display screen of an operating section in the present embodiment;

FIG. 4A is a graph of red, FIG. 4B is a graph of green, and FIG. 4C is a graph of blue;

FIG. 5 is a table showing a sentence example displayed on the controlling section of the present embodiment;

FIG. 11 is a table showing a sentence example displayed on a controlling section in a conventional image forming apparatus.

DETAILED DESCRIPTION OF THE INVENTION

Hereinafter, an embodiment of an image forming apparatus 1 which incorporates an image processing apparatus of the present invention will be described with reference to the drawings. However, the scope of the invention is not limited to illustrated examples.

Figure 1:
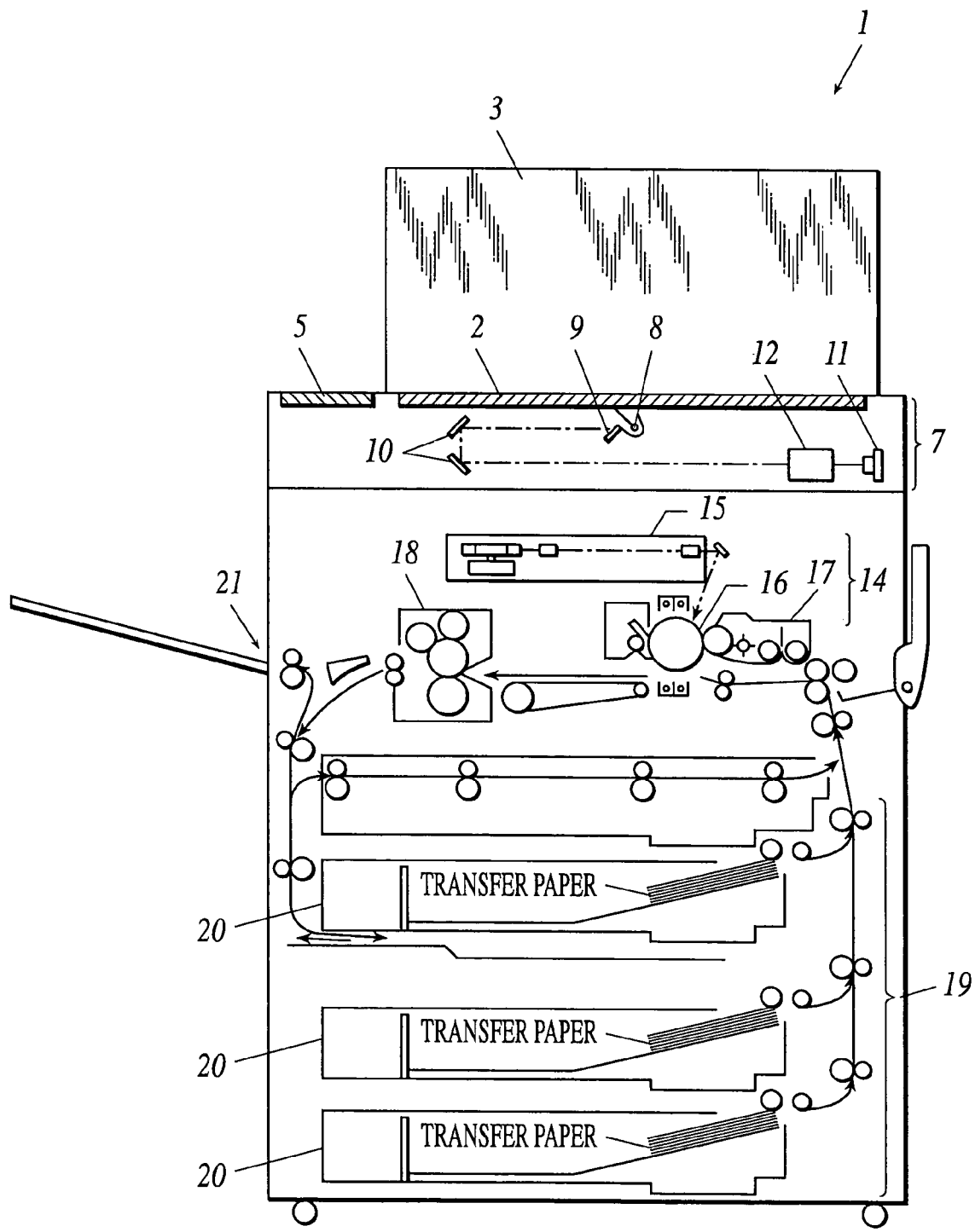
FIG. 1 is a schematic constitutional view of an image forming apparatus in the present embodiment.

FIG. 1 is a schematic constitutional view which shows an image forming apparatus 1 of the present embodiment. As shown in FIG. 1, on the upper surface of a body of the image forming apparatus 1, a tabular stage 2 to mount an original manuscript is provided. On one side of the stage 2, a cover 3 to cover the stage 2 is provided pivotally on the side so that the cover 3 can freely open and shut. Furthermore, on the upper surface of the stage 2, a detect sensor 4 to detect whether the cover 3 is open or closed, or whether the cover 3 covers the stage 2 or not (see FIG. 2) is provided. The detect sensor 4, for example, comprises a light emitting section and a light receiving section which are not shown, and judges whether the cover 3 is closed or not based on whether the light receiving section receives light emitted from the light emitting section.

On the upper surface of a body of the image forming apparatus 1 and at the side of the stage 2, an operating section 5 is provided which displays not only an operation condition of the image forming apparatus 1 but also an icon and button to input various operation directions. The operating section 5, for example, comprises a known touch panel, and a user inputs the operation directions by pushing the displayed icon or button.

Inside the image forming apparatus 1 and below the stage 2, an image reading section 7 is provided which reads information of external light entering to the stage 2 and image information of original manuscript, and converts the information of external light and the image information into an electrical signal. The image reading section 7 comprises a light source 8 to project light upward provided movably along the stage 2. Below the light source 8, a mirror 9 is provided movably together with the light source 8, to which light emitted from the light source 8 and reflected on an original manuscript, external light and the like enters. A pair of reflecting mirrors 10 is provided in an optical path of the light reflected by the mirror 9 so as to guide the light into a CCD unit 11. The CCD unit 11 comprises a light separating section such as a color filter 12 so as to separate the entered light into three colors of R(red), G(green), and B(blue). In addition, the CCD unit 11 has a photoelectric conversion function, and generates an electric signal based on light intensity of each separated color.

Inside the image forming apparatus 1 and below the image reading section 7, a known image forming apparatus 14 is provided which forms an image on a transfer paper as a recording material based on image information from a controlling section 13 described below. The image forming apparatus 14 comprises an image writing section 15 which oscillates a laser beam based on the electrical signal. In an optical path of the laser beam oscillated from the image writing section 15, a photoreceptor drum 16 is rotatably provided which forms an electrostatic latent image related to an image of original manuscript thereon. At a side of the photoreceptor drum 16, a developing section 17 is provided which transfers toner to the electrostatic latent image. Furthermore, just under the photoreceptor drum 16, a transfer paper as a recording material is conveyed so that toner is transferred when a transfer paper faces with the photoreceptor drum 16. In a path where transfer paper is conveyed after toner is transferred, a fixing section 18 is provided which fixes toner to the recording material.

Moreover, below the image forming section 14, a conveying section 19 is provided which comprises a plurality of rollers to convey a transfer paper. The conveying section 19 comprises a feeding tray 20 to which a pre-printed paper is fed and an ejecting tray 21 to which a post-printed transfer paper is ejected.

Next, a control system of the image forming apparatus 1 will be described with reference to FIG. 2. The image forming apparatus 1 comprises an image processing apparatus 6 which detects an image area based on an image data and an external light data sent from the image reading section 7 so as to erase a non-image area. The image processing apparatus 6 comprises an external light memory section 61 which stores an external light data and determines the histograms thereof by each color, a judging section 62 which judges whether the environment is suitable to erase a non-image area by calculating an external light level by each color from the higher luminance out of the luminance values of a foot of a peak including a maximum frequency value measured on the histograms, an image memory section 63 which stores the image data, and an area detecting section 64 which determines a non-image area erase threshold based on the external light level, detects the image area and erases the non-image area.

Figure 4A:
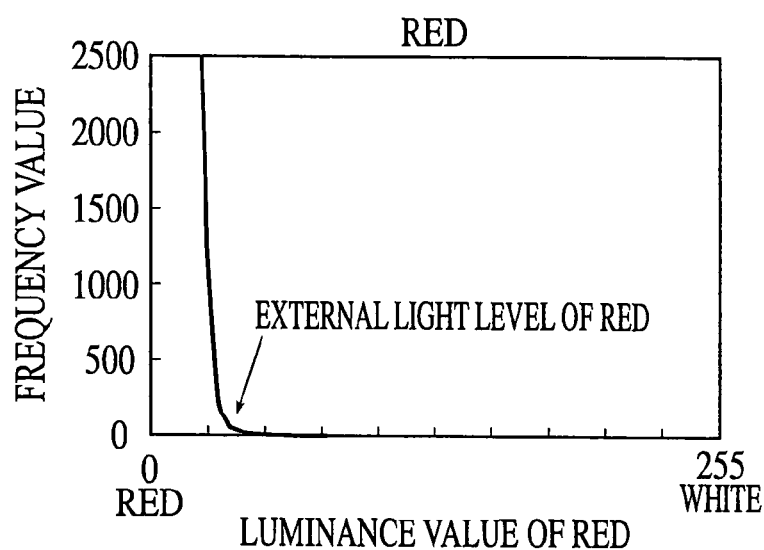
FIGS. 4A to 4C are graphs showing histogram data examples of external light formed in the present embodiment.
Figure 4B:
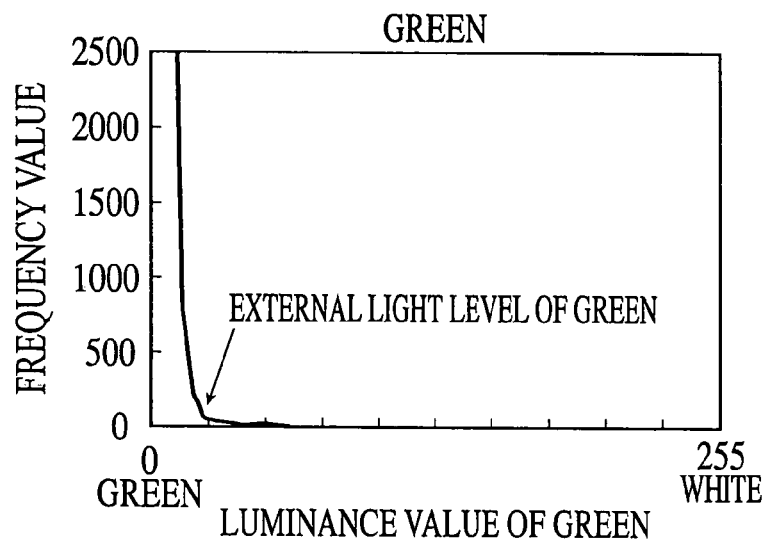
Figure 4C:
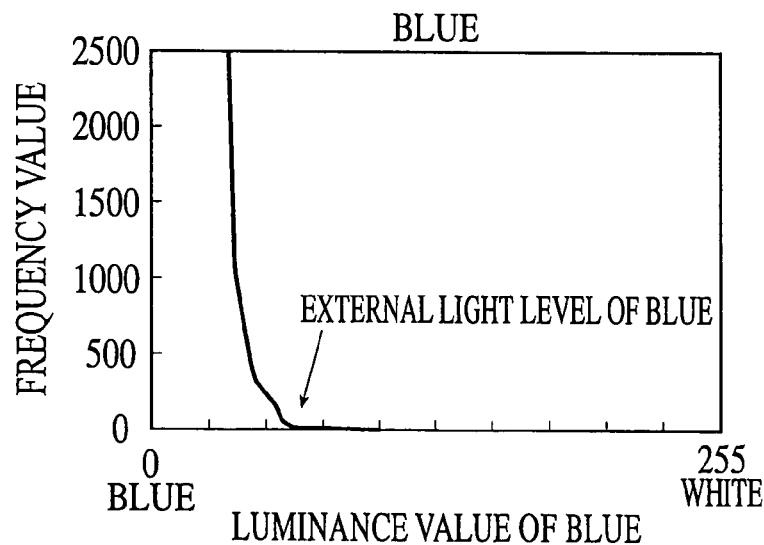

The external light memory section 61 obtains a 255 gradation luminance data and frequency value data based on intensity of an electric signal from the image reading section 7 as luminance of the stored external light data of each color. In addition, based on the data, the external light memory section 61 obtains the histograms of each color as shown in FIG. 4.

The judging section 62 scans the histograms from lower luminance. When it continues that a scanned luminance is a predetermined level or less and the frequency value thereof is lower than a predetermined value, the judging section 62 calculates the external level from the luminance value (see FIG. 7). Moreover, the judging section 62 judges which Warning Level (hereinafter referred to as "WL") the installation environment belongs to based on whether or not a sum of frequency value rates within a predetermined range of luminance is higher than the predetermined value in the histograms (see FIG. 9). The judging section 62 continues scanning the external light level so as to update the histograms until the judging section 62 determines which WL installation environment belongs to.

The image memory section 63 obtains a 255 gradation luminance data and frequency data based on intensity of an electric signal from the image reading section 7 as an image data from the image reading section 7.

The area detecting section 64 sets the non-image area erase threshold of each color as the external light level. At this point, the non-image area erase threshold is a criterial threshold which distinguishes an image area from a non-image area. The area detecting section 64 detects an area showing the luminance value which is the non-image area erase threshold or more as the image area. In addition, when a user selects one level from the external light levels of each color through the operating section 5, the area detecting section 64 determines the non-image area erase thresholds of all the colors as the selected external light level. Moreover, the area detecting section 64 determines the non-image area erase threshold as the highest luminance value or the lowest luminance value out of the external light levels of each color in response to directions from a user and various conditions. Furthermore, the area detecting section 64 detects the image area based on the determined non-image area erase threshold and replaces a black pixel outside the detected image area with a white pixel. Thus, the area detecting section 64 erases the non-image area. However, a method to erase a non-image area is not particularly limited and any method is applicable so long as the method does not form an image in the predetermined area.

Figure 2:
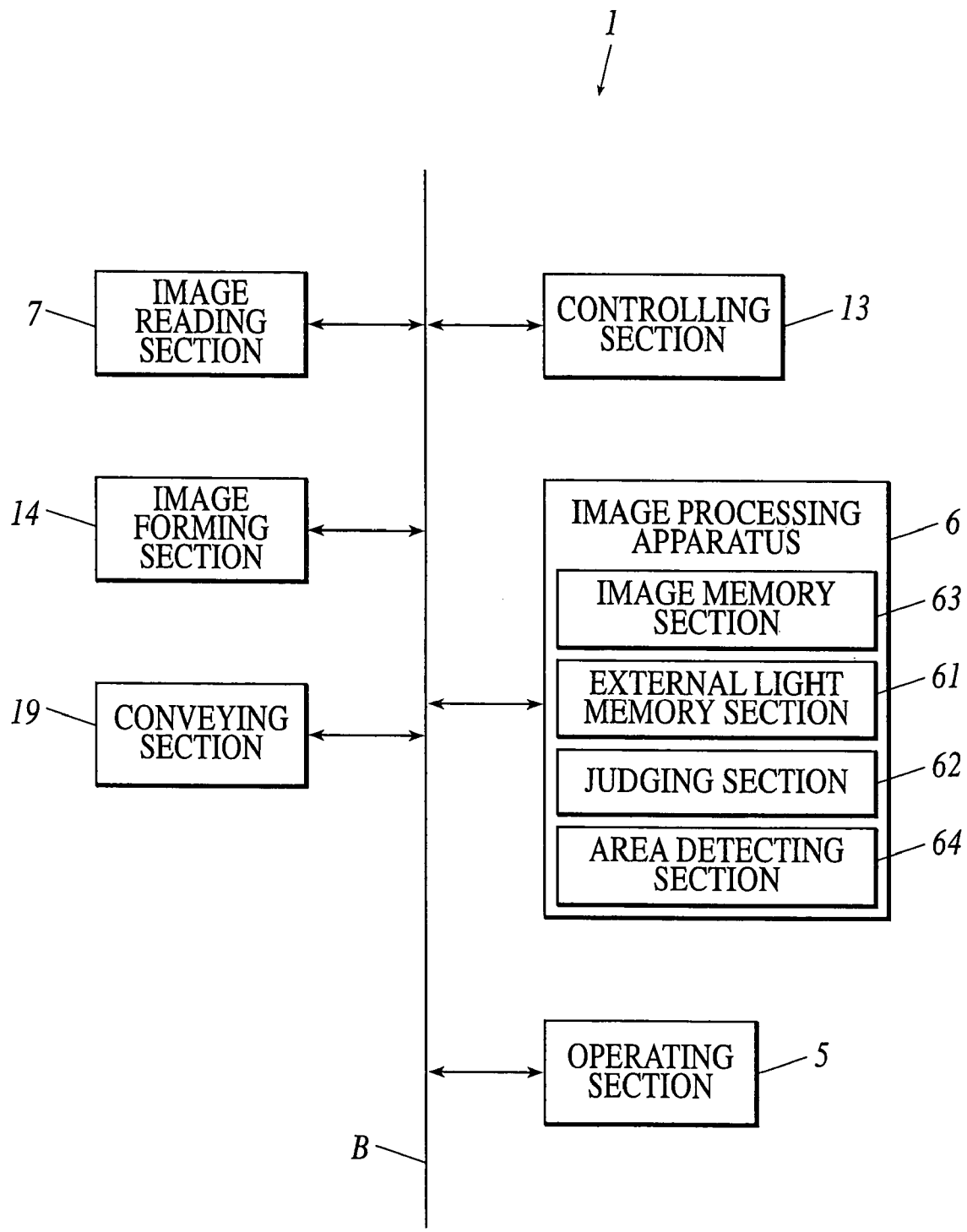
FIG. 2 is a block diagram showing a control system of an image forming apparatus in the present embodiment.

As shown in FIG. 2, the controlling section 13 controls the image reading section 7, image processing section 6, operating section 5, image forming section 14, conveying section 19 and the like of the image forming apparatus 1 through a data bus B. The controlling section 13 comprises a CPU, a ROM, a RAM (neither of them are not shown). The CPU develops a processing program of the present invention recorded in the ROM into the RAM and executes the processing program.

The controlling section 13 allows the image reading section 7 to read the external light data and image data, and allows the image processing apparatus 6 to detect the image area and to erase the non-image area.

In addition, the controlling section 13 allows the conveying section 19 to convey a transfer paper from the feeding tray 20 to the image forming section 14, and allows the image forming section 14 to form an image on a transfer paper based on the image data in which the non-image area is erased. That is, the controlling section 13 allows the image writing section 15 to oscillate a laser beam based on an electric signal from the image processing apparatus 6 and to form an electrostatic latent image on the top surface of the photoreceptor drum 16.

The controlling section 13 allows the developing section 17 to adhere toner to the electrostatic latent image on the photoreceptor drum 16, and to transfer toner from the photoreceptor drum 16 to a transfer paper. Furthermore, the controlling section 13 allows the conveying section 19 to convey the copied transfer paper to the ejecting tray 21 via the fixing section 18 at predetermined timing.

When the detect sensor 4 judges that the cover 3 is closed, as shown in FIG. 3, the controlling section 13 allows the operating section 5 to display a detection result. The controlling section 13 also allows the operating section 5 to display a start button to start a check of installation environment. Furthermore, the controlling section 13 allows the operating section 5 to display a display screen corresponding to the WL determined by the judging section 62 (see FIG. 5).

Hereinafter, an image processing method of the image forming apparatus 1 and the image processing apparatus 6 will be described. Herein, an image processing program to perform an image processing method of the present invention is recorded in a recording medium.

Figure 6:
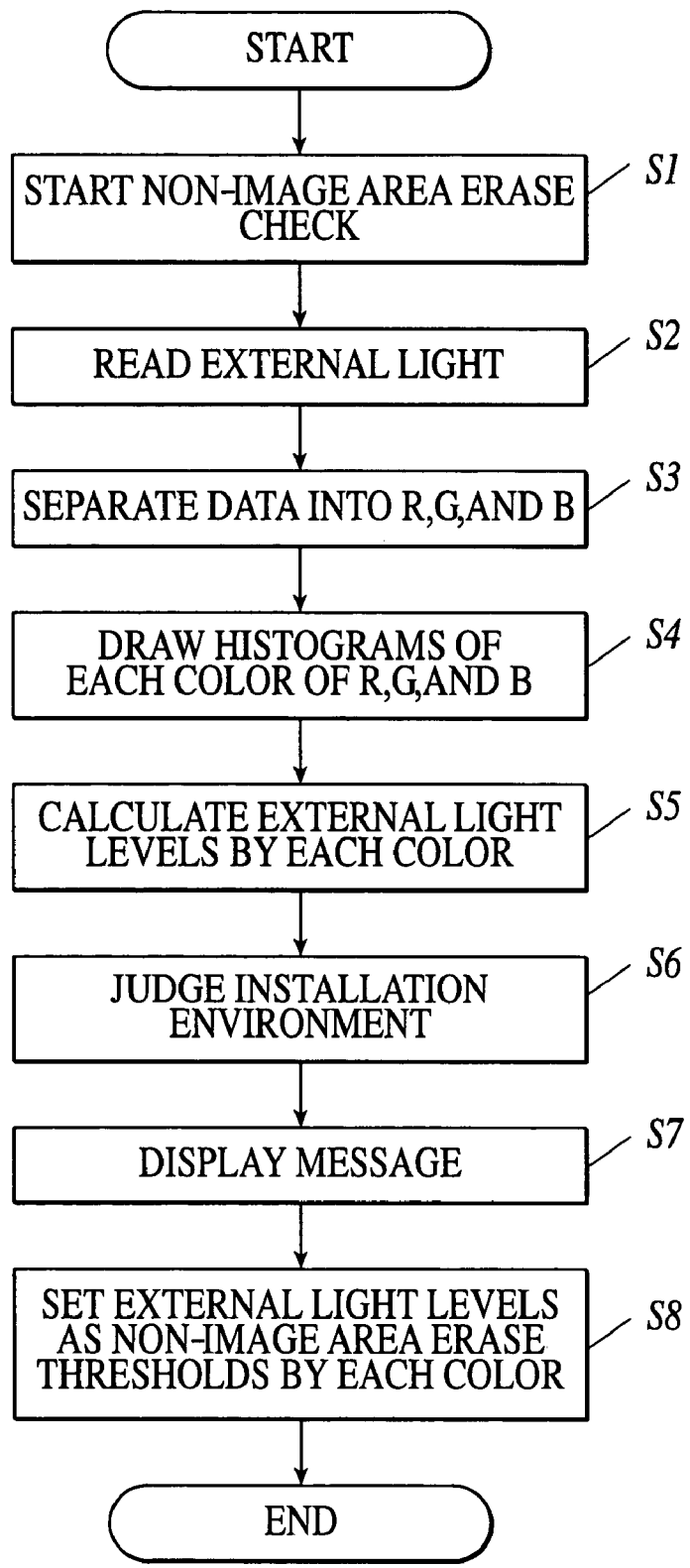
FIG. 6 is a flowchart showing a procedure of installation check in the present embodiment.

First, a user starts a check of installation environment of the image forming apparatus 1. Hereinafter, a processing procedure for checking the installation environment will be described with reference to FIG. 6.

Before the installation check starts, when the detect sensor 4 judges that the cover 3 covers the stage 2, the operating section 5 displays the sentence, "Open the cover. Push the start button, and the check starts." (see FIG. 3). If a user opens the cover 3 and pushes the start button of the operating section 5, the check of installation environment starts (step S1).

Once the check of installation environment starts, the image reading section 7 reads the external light entering to the stage 2 (step S2). In detail, the light source 8 and the mirror 9 scan the whole area of the stage 2, and the external light entering to the stage 2 is guided into the CCD unit 11 by the mirror 9 and the reflecting mirror 10.

The light entering to the CCD unit 11 is separated into three colors of R, G, and B by the color filter 12 of the CCD unit 11, and each of the colors is converted photoelectrically and is sent as the image data by the external light memory section 61 (step S3). The external light memory section 61 determines the histograms as shown in FIG. 4 based on the luminance data of each color of the external light data (step S4).

Once the histograms are drawn, the judging section 62 calculates the external light levels of each color (step S5) and judges the installation environment based on each histogram (step S6).

Figure 7:
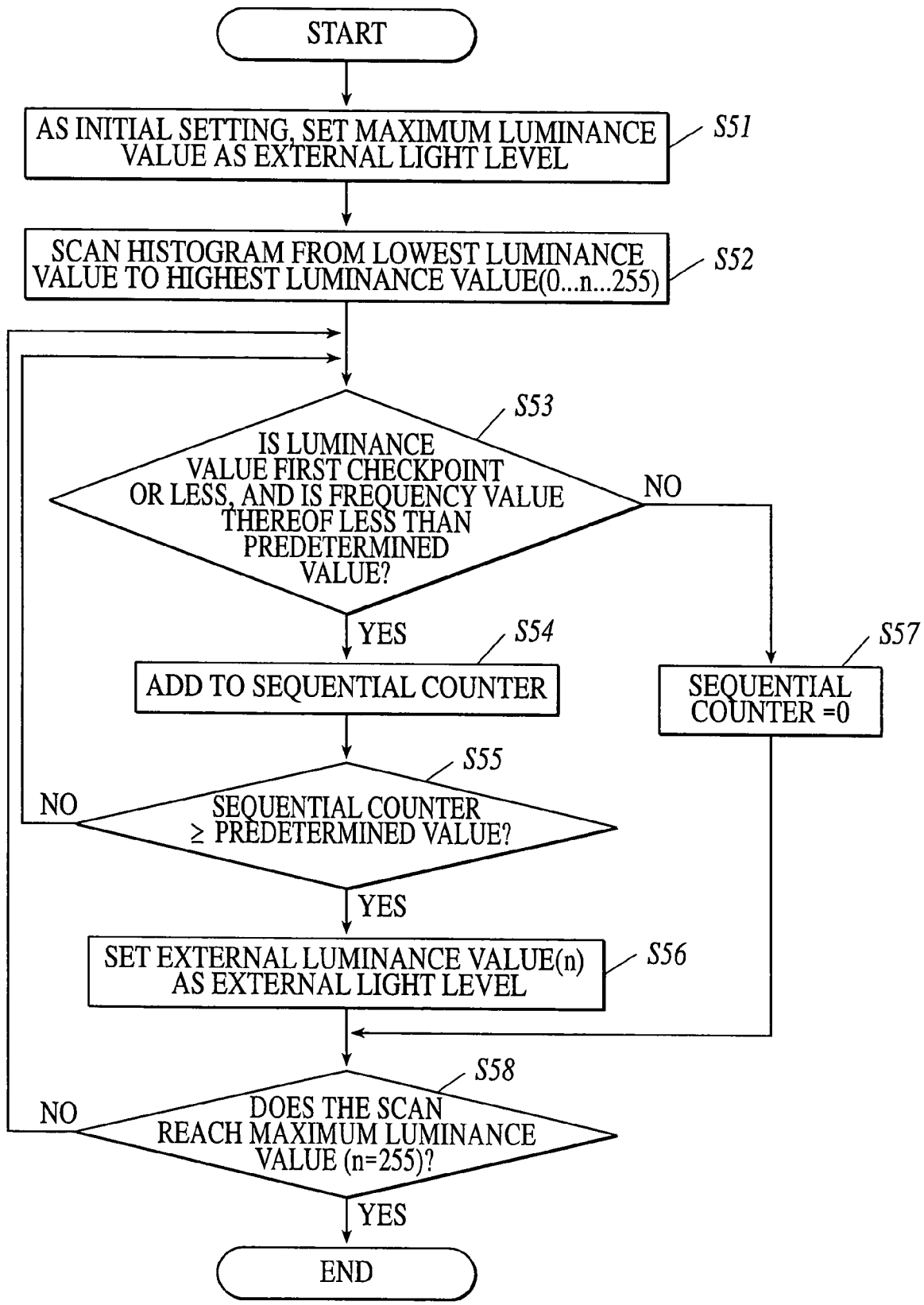
FIG. 7 is a flowchart showing a method of calculating an external light level in the present embodiment.

At this point, a method of calculating the external light level by the judging section 62 in the present embodiment will be described based on the flowchart shown in FIG. 7.

Figure 8:
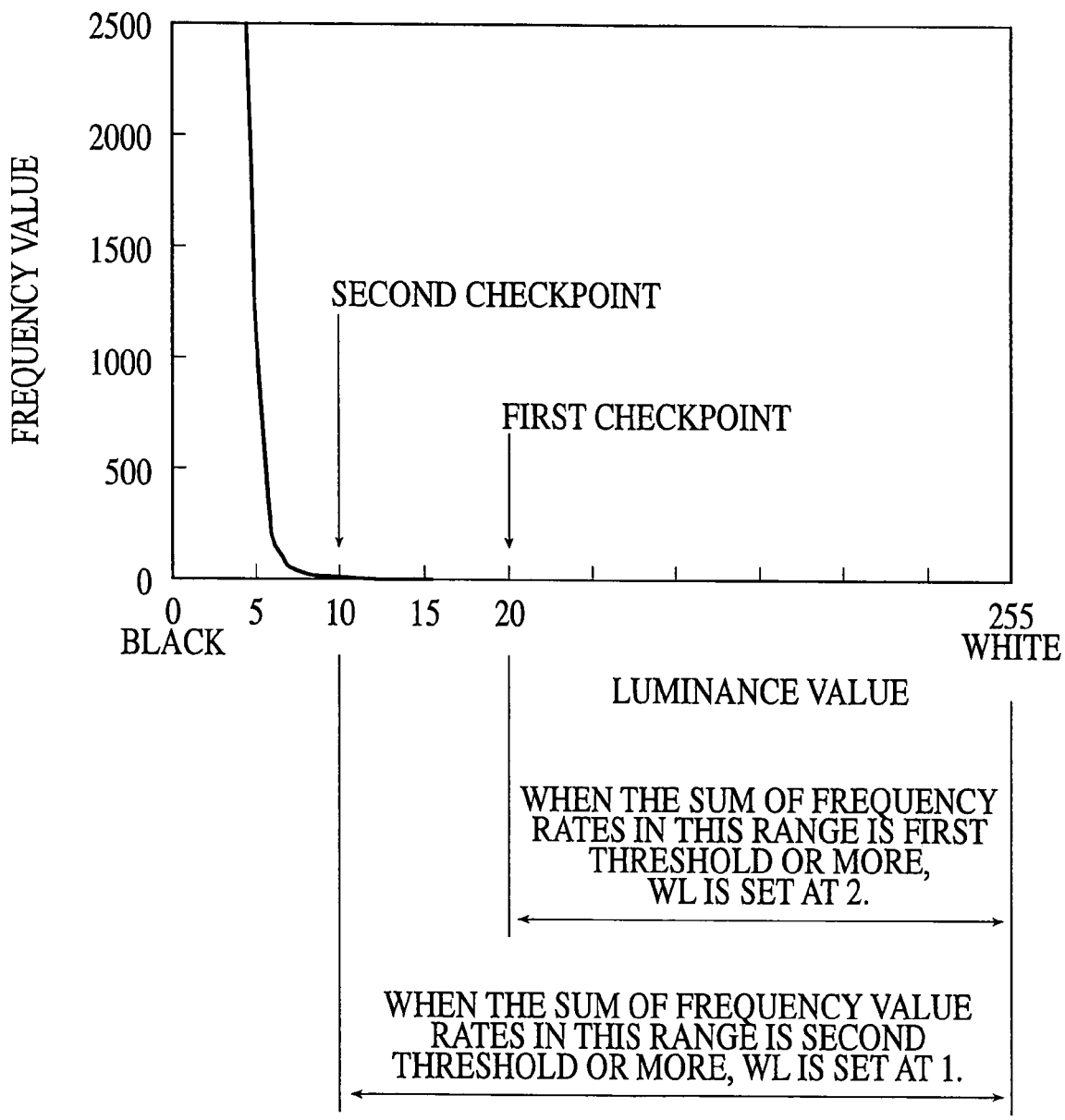
FIG. 8 is a chart describing a checkpoint and WL in the present embodiment.

First, a maximum luminance value, which is measured on a histogram obtained in a poor environment such that there is no unnecessary light but intensity of external light is high, is set as a first checkpoint. Also, as an initial condition, on the histogram obtained in the actual installation environment of the image forming apparatus 1, a maximum luminance value (n=255) is once set as the external light level (step S51). As shown in FIG. 8, in the present embodiment, a luminance value n of the first checkpoint was set at 20. Herein, when the highest density value (the darkest color) generated by toner is nearly 1.5, a luminance value 20 is nearly equivalent to 1.14.

Next, the histogram is scanned from the lowest luminance value (n=0) to the highest luminance value (n=255) (step S52), and the frequency value rates of each luminance value are checked. A frequency value rate shows a rate for the whole frequency value data. Each judgment based on the frequency value rate enables judging the same way regardless of a form of the histograms or the sum of frequency values.

When a luminance value n is detected which is the first checkpoint or less and whose frequency value rate is less than the predetermined value (step S53; Yes), one is added in a sequential counter (step S54). When the sum in the sequential counter is the predetermined value or more as a result of the addition (step S55; Yes), the luminance value n is set as the external light level (step S56). The scanning of the histograms and this operation are continued until the luminance reaches the maximum luminance value (step S58; Yes), and the process ends.

On the other hand, when a luminance value n is more than the first checkpoint, or the frequency value rate thereof is more than the predetermined value (step S53; No), zero is set in the sequential counter (step S57). When the sum in the sequential counter is less than the predetermined value (step S55; No), or when the scanning does not reach the maximum luminance value (step S58; NO), the scanning of the histogram starts again and the process returns to step S53.

Figure 9:
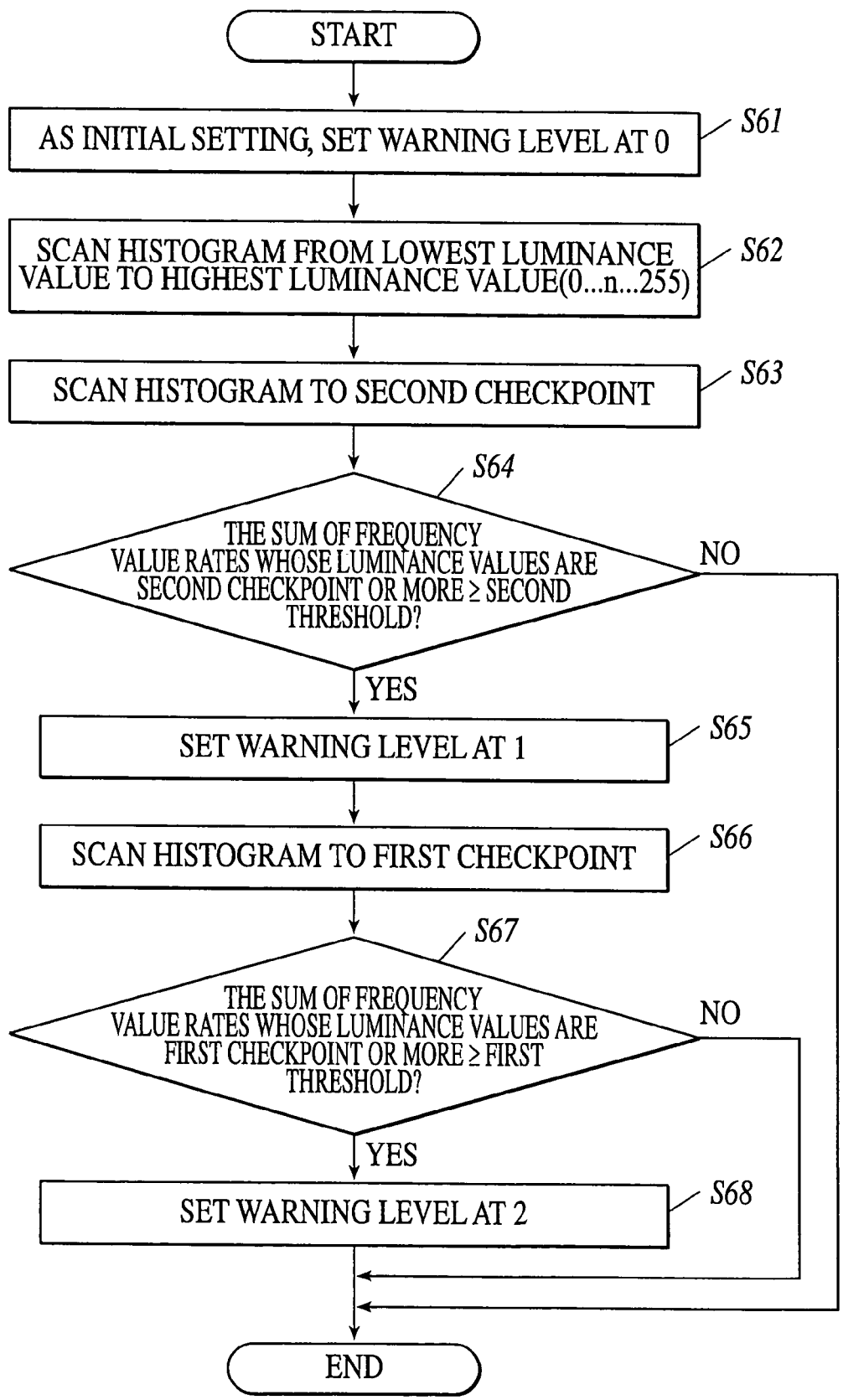
FIG. 9 is a flowchart showing a judging method in an installation check of the present embodiment.
Figure 10:
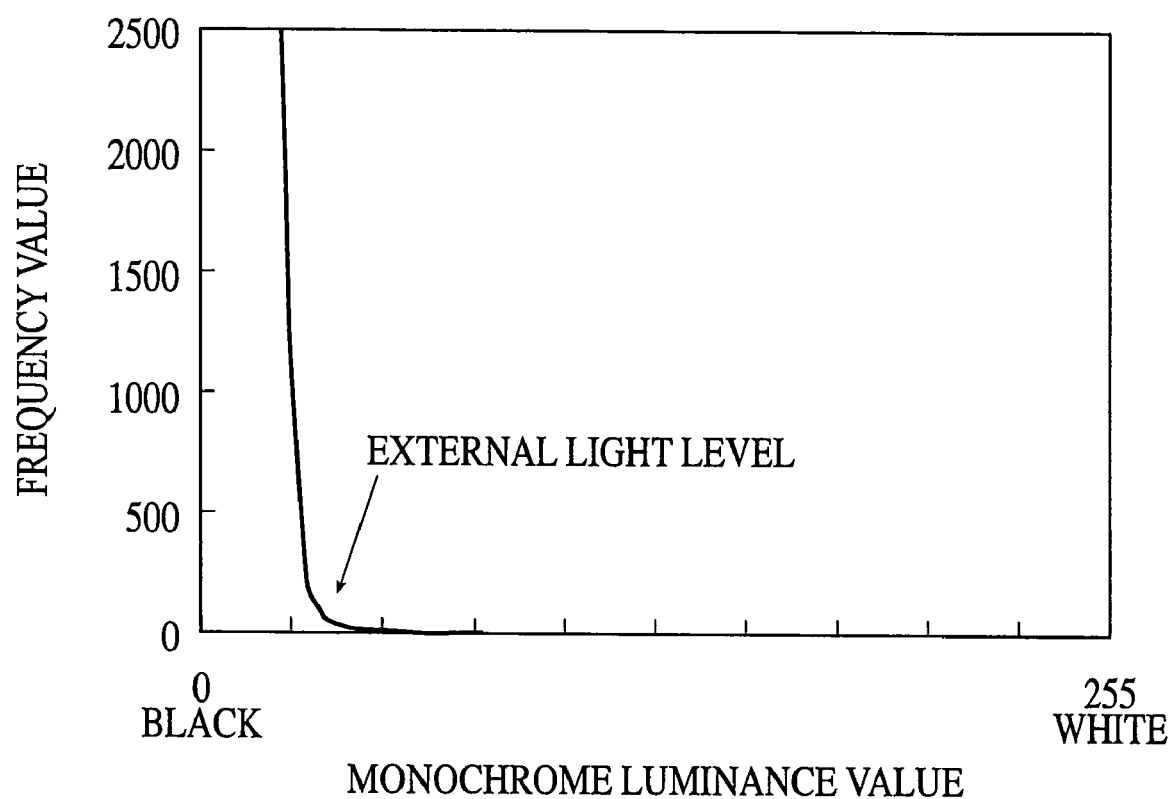
FIG. 10 is a graph showing a histogram data example of external light formed in a conventional image forming apparatus.

Next, a method of judging installation environment by the judging section 62 in the present embodiment will be described based on the flowchart in FIG. 9. It is noted that the method of judging installation environment and a method of calculating external light level are conducted simultaneously.

First, a second checkpoint is set as a luminance value between the first checkpoint and the minimum luminance value (n=0). In the present embodiment, a luminance value n of the second checkpoint was set at 10 (see FIG. 8).

Next, a threshold is set for the sum of frequency value rate within a range from each checkpoint to the maximum luminance value. WL is judged based on whether the sum of frequency value rate is each threshold or more. In the present embodiment, the first threshold of the first checkpoint is set at 10 (%), and the second threshold of the second checkpoint is set at 30 (%). Each threshold is not particularly limited, and it is possible that these thresholds are set at the same value.

Moreover, the judging section 62 sets WL at 0 as an initial condition (step S61), and scans the histogram from the lowest luminance value to the maximum luminance value (step S62).

The judging section 62 scans the histogram to the second checkpoint (step S63), and calculates the sum of frequency value rate within a range from the second checkpoint to the maximum luminance value. When the calculated result is the second threshold or more (step S64; Yes), WL is set at 1 (step S65). Thereafter, the judging section 62 scans the histogram to the first checkpoint (step S66), and calculates the sum of frequency value rate within a range from the first checkpoint to the maximum luminance value. When the calculated result is the first threshold or more (step S67; Yes), WL is set at 2 (step S68) and the process ends.

When the sum of frequency value rate within a range from the second checkpoint to the maximum luminance value is less than the second threshold (step S64; No), or when the sum of frequency value rate within a range from the first checkpoint to the maximum luminance value is less than the first threshold (step S67; No), WL is kept at 0 and the process ends.

Thus, once the judging section 62 judges the installation environment, the operating section 5 displays a sentence based on WL (step S7). A display example of the judgment result by the operating section 5, as shown in FIG. 5, is easy to understand for a user. Specifically, when WL is 0, the installation environment is suitable for erasing the non-image area and the operating section 5 displays such content. When WL is 1, it is possible that a color whose external light level is high is included and the operating section 5 displays such content. When WL is 2, it is judged that a color whose external light level is high is included, and the operating section 5 displays such content. Herein, the installation environment is judged by each color. Therefore, the judgment result is displayed by each color.

Thereafter, the judging section 62 sets the non-image area erase threshold as the calculated external light level by each color (step S8), and the non-image area erase check ends. At this point, calculated external light levels comprise three colors of R, G, and B. One external light level is selected on the operating section 5, the selected external light level is set as the non-image area erase threshold. Besides, when a setting condition of the non-image area erase threshold is directed on the operating section 5, the highest or the lowest luminance value out of external light levels of the three colors is set as the non-image area erase threshold.

Thus, once the installation environment is checked and the non-image area erase threshold is set, the area detecting section 64 allows the image reading section 7 to read an image data of the manuscript mounted on the stage 2, detects the manuscript area based on the non-image area erase threshold, and replaces a black pixel located outside the detected image area with a white pixel so as to erase a non-image area. The image forming section 14 forms an image on a transfer paper based on the image data in which a non-image area is erased. The conveying section 19 conveys the transfer paper from the feeding tray 20 to the ejecting tray 21 via the image forming section 14 at predetermined timing.

As described above, the image processing apparatus 6 in the present embodiment erases the non-image area in consideration of the external light level measured on the histograms of each color of the external light. Therefore, it is possible that the image forming apparatus compatible with a colored original manuscript erases the non-image area corresponding to a color of external light.

Also, since an image area is recognized in consideration of the color of external light, it is possible to precisely erase the non-image area.

In addition, since the non-image area erase threshold is set at a luminance value which meets at least one external light level or the luminance value which meets all the external light levels, it is possible to erase the non-image area under various installation environments and conditions.

Moreover, when one external light level is selected through an operating section or the like so as to set the non-image area erase threshold, it is possible to erase the non-image area under various installation environments and conditions.

Furthermore, by watching the operating section 5, it is possible for the user to easily learn about external light information including a color of external light and advisability of installation environment for non-image area erase.

The entire disclosure of Japanese Patent Application No. 2005-234346 filed on Aug. 12, 2005, including description, claims, drawings and summary are incorporated herein by reference.

What is claimed is:

1. An image processing apparatus comprising:
an image memory section to store image data obtained by reading an image of an original manuscript;
an external light memory section to store data of external light entering a stage for the original manuscript and to form histograms of each color of the external light based on the data of the external light;
a judging section to calculate an external light level of each color from a higher luminance value out of luminance values of a foot of a peak including a maximum frequency value measured on the histograms; and an area detecting section to determine a non-image area erase threshold based on the external light level of each color, so as to detect an image area and to erase a non-image area;

wherein the judging section judges by each color whether an environment is suitable for erasing the non-image area based on the external light level of each color.

2. The image processing apparatus of claim 1, wherein the area detecting section determines the non-image area erase threshold of each color as the external light level of each corresponding color.

3. The image processing apparatus of claim 1, wherein the area detecting section determines the non-image area erase threshold as a highest luminance value out of the external light level of each color.

4. The image processing apparatus of claim 1, wherein the area detecting section determines the non-image area erase threshold as a lowest luminance value out of the external light level of each color.

5. The image processing apparatus of claim 1, wherein the area detecting section sets the non-image area erase threshold of all colors as one selected external light level.

6. An image forming apparatus comprising:
   an image reading section to read external light data and image data;
   an image processing apparatus comprising:
      an image memory section to store image data obtained by reading an image of an original manuscript,
      an external light memory section to store data of external light entering a stage for the original manuscript and to form histograms of each color of the external light based on the external light data,
      a judging section to calculate an external light level of each color from a higher luminance value out of luminance values of a foot of a peak including a maximum frequency value measured on the histograms, and
      an area detecting section to determine a non-image area erase threshold based on the external light level of each color so as to detect an image area and to erase a non-image area,
      wherein the judging section judges by each color whether an environment is suitable for erasing the non-image area based on the external light level of each color;
   an operating section to display a judgment result of whether the environment is suitable for erasing the non-image area and information of a color regarding the judgment result;
   an image forming section to form an image on a recording material based on a signal from the image processing apparatus; and
   a controlling section to allow the image reading section to read the image data, to allow the operating section to display a judgment result of whether the environment is suitable for erasing the non-image area, to allow the image processing apparatus to process the image data, and to allow the image forming section to form the image based on the processed image data.

7. An image processing method for an image forming apparatus which comprises an image memory section, an external light memory section, and an operating section, the method comprising:
   storing image data obtained by reading an image of an original manuscript in the image memory section;
   forming histograms of each color of external light based on external light data stored in the external light memory section, which is obtained by storing data of external light entering a stage for the original manuscript in the external light memory section;
   calculating an external light level of each color from a higher luminance value out of luminance values of a foot of a peak including a maximum frequency value measured on the histograms;
   determining a non-image area erase threshold based on the external light level of each color so as to detect an image area and to erase a non-image area of the image data;
   judging by each color whether an environment is suitable for erasing the non-image area based on the external light level of each color; and
   displaying on the operating section a judgment result of whether the environment is suitable for erasing the non-image area and information of a color regarding the judgment result.

8. The image processing method of claim 7, wherein the non-image area erase threshold of each color is determined as the external light level of each corresponding color.

9. The image processing method of claim 7, wherein the non-image area erase threshold is determined as a highest luminance value out of the external light level of each color.

10. The image processing method of claim 7, wherein the non-image area erase threshold is determined as a lowest luminance value out of the external light level of each color.

11. The image processing method of claim 7, wherein the non-image area erase threshold of all colors is set as one selected external light level.

12. A recording medium having stored thereon a program which controls a computer to perform functions comprising:
   storing image data obtained by reading an image of an original manuscript in an image memory section;
   forming histograms of each color of external light based on external light data stored in an external light memory section, which is obtained by storing data of external light entering a stage for the original manuscript in the external light memory section;
   calculating an external light level of each color from a higher luminance value out of luminance values of a foot of a peak including a maximum frequency value measured on the histograms;
   allowing an area detecting section to determine a non-image area erase threshold based on the external light level of each color so as to detect an image area and to erase a non-image area of the image data;
   judging by each color whether an environment is suitable for erasing the non-image area based on the external light level of each color; and
   displaying on an operating section a judgment result of whether the environment is suitable for erasing the non-image area and information of a color regarding the judgment result.

13. The recording medium of claim 12, wherein the non-image area erase threshold of each color is determined as the external light level of each corresponding color.

14. The recording medium of claim 12, wherein the non-image area erase threshold is determined as a highest luminance value out of the external light level of each color.

15. The recording medium of claim 12, wherein the non-image area erase threshold is determined as a lowest luminance value out of the external light level of each color.

16. The recording medium of claim 12, wherein the non-image area erase threshold of all colors is set as one selected external light level.

* * * * *